United States Patent [19]

Sommeria

[11] 4,409,527
[45] Oct. 11, 1983

[54] TRANSISTOR MOTOR CONTROL

[76] Inventor: Marcel R. Sommeria, P.O. Box 371, Palos Heights, Ill. 60463

[21] Appl. No.: 292,161

[22] Filed: Aug. 12, 1981

Related U.S. Application Data

[63] Continuation of Ser. No. 54,419, Jul. 3, 1979, abandoned.

[51] Int. Cl.³ ............................................. H02P 5/06
[52] U.S. Cl. ..................... 318/341; 318/311
[58] Field of Search ............................. 318/311–312, 318/319, 326, 329, 257, 447, 449, 450, 465, 280, 287, 290, 291, 293, 294, 54, 65, 256, 341, 301; 328/35, 36; 307/254, 255, 38, 227, 228

[56] References Cited

U.S. PATENT DOCUMENTS

| | | | |
|---|---|---|---|
| 3,110,853 | 11/1963 | Jones | 318/312 |
| 3,237,075 | 2/1966 | Sommeria | 318/327 |
| 3,344,331 | 9/1967 | Adler et al. | 318/294 |
| 3,426,262 | 2/1969 | Colter | 318/329 X |
| 3,480,849 | 11/1969 | Thornsen et al. | 318/257 |
| 3,548,278 | 12/1970 | Sommeria | 318/257 |
| 3,588,650 | 6/1971 | Bevis | 318/341 X |
| 3,654,558 | 4/1972 | Tomisawa | 328/35 |
| 3,770,986 | 11/1973 | Drehle | 307/255 X |
| 3,786,333 | 1/1974 | Sommeria | 318/604 |
| 3,989,992 | 11/1976 | Schmidt | 318/257 |
| 4,072,883 | 2/1978 | Beiter | 318/257 |
| 4,146,827 | 3/1979 | Krohn | 318/341 |

Primary Examiner—Ulysses Weldon
Attorney, Agent, or Firm—Hill, Van Santen, Steadman, Chiara & Simpson

[57] ABSTRACT

Transistor motor control incorporates a transistor bridge circuit for controlling application of power to a DC motor for forward and reverse rotation. The speed of the motor is controlled by pulse modulation, under the control of a digital counter. The counter produces a voltage stair-step waveform which is compared with a feed-back voltage. The direction of motor energization is controlled by the sign of the feed-back signal, and the transistors of the bridge are inhibited for at least one cycle prior to reversing direction.

3 Claims, 3 Drawing Figures

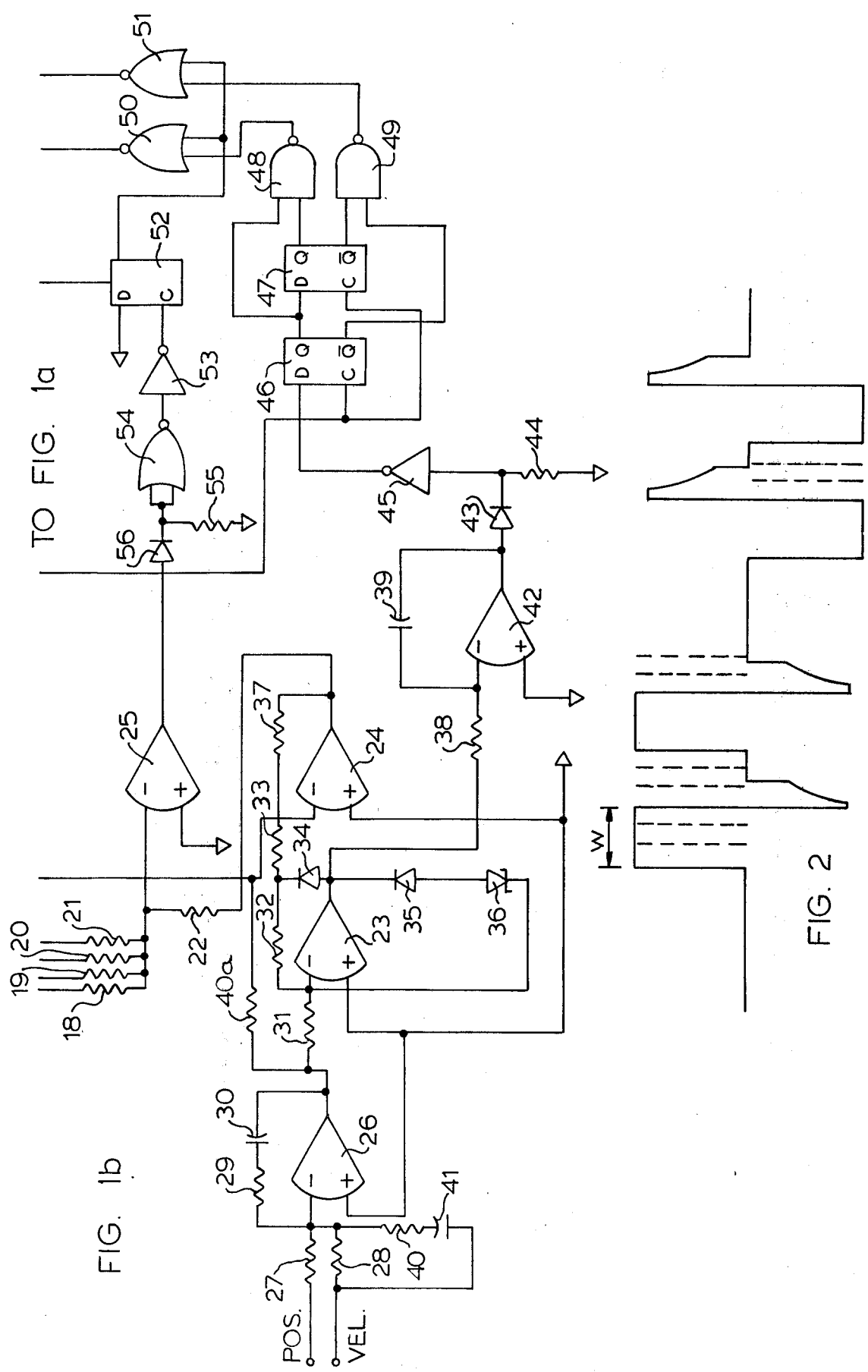

4,409,527

TRANSISTOR MOTOR CONTROL

This is a continuation, of application Ser. No. 054,419, filed July 3, 1979 now abandoned.

BACKGROUND

1. Field of the Invention

The present invention relates to motor controls, but more particularly to digitally operated motor controls employing transistors as the driving elements of the motor.

2. The Prior Art

A variety of digital motor controls have been developed in the past, and many of them are effective for the purposes for which they are intended. However, the controls which are capable of high precision are relatively costly and complex, while simpler controls are not capable of a high degree of control. Accordingly, it is desirable to provide a very simple transistorized motor control, which is capable of high accuracy and precision.

BRIEF DESCRIPTION OF THE INVENTION

It is a principal object of the present invention to provide a simple motor control employing transistors as the driving elements, and employing a relatively simple digital circuit for controlling the driving transistors.

Another object of the present invention is to provide a circuit for deriving a control signal from the sign of a feedback signal, for controlling the direction of rotation of the motor.

Another object of the present invention is to provide a circuit in which all of the driving transistors are deenergized for a period when the direction of rotation of the motor is to be reversed.

In one embodiment of the present invention, there is provided a bridge circuit incorporating four driving transistors, controlled in pairs to energize a DC motor in opposite directions. The transistors are controlled by a pulse width modulated signal, in accordance with the comparison of the feed-back signal with a digitally generated stair-step signal. The direction of rotation is determined from the sign of the feed-back signal, and means is provided for deenergizing the driving transistors for at least one cycle when the direction of rotation is to be reversed.

BRIEF DESCRIPTION OF THE DRAWINGS

Reference will now be made to the accompanying drawings in which:

FIGS. 1a and 1b is a functional block diagram of an illustrative embodiment of the present invention; and FIG. 2 is an illustration of certain waveforms encountered in operation of the apparatus.

DESCRIPTION OF THE PREFERRED EMBODIMENT

Figure 1A:
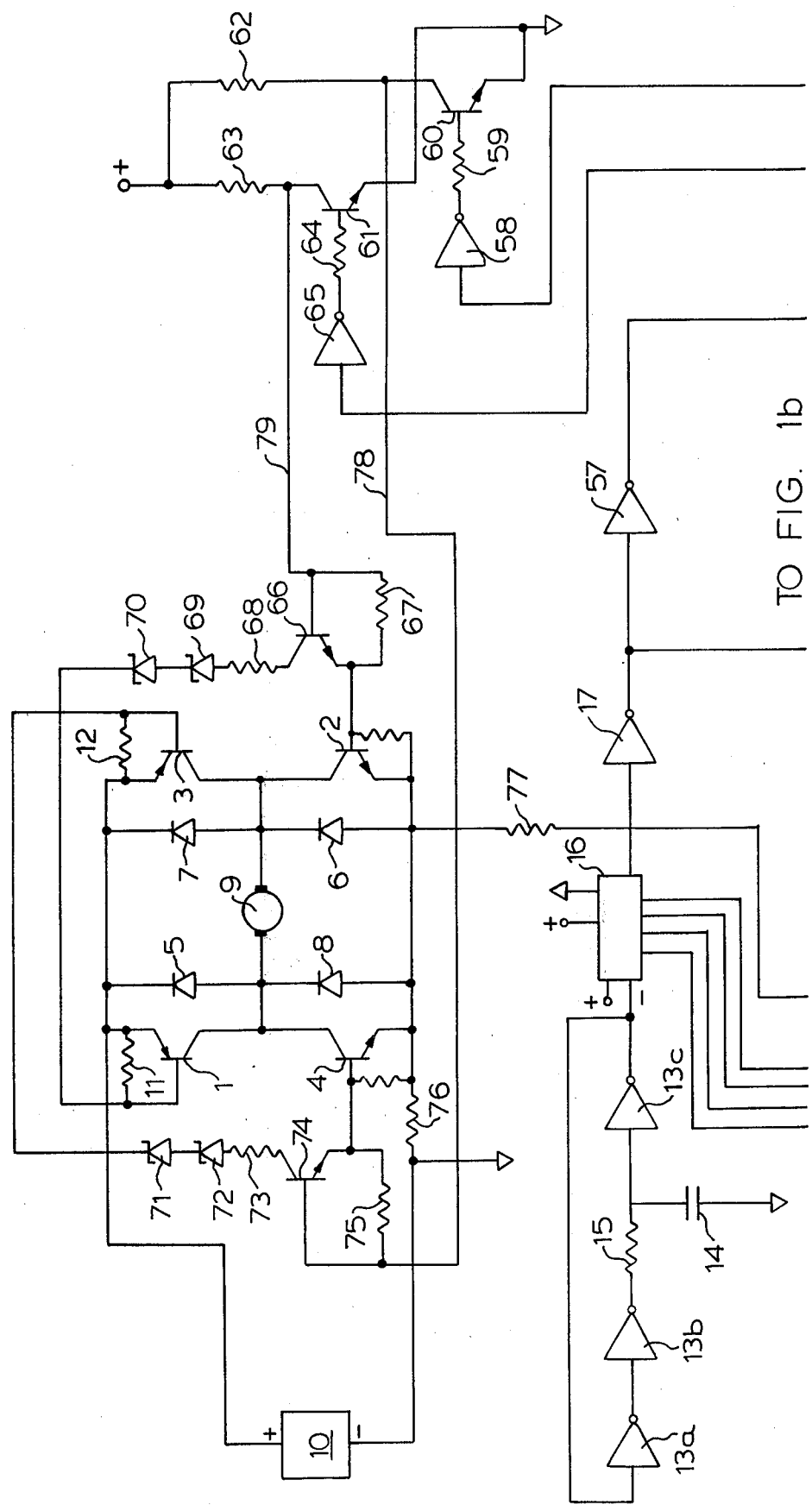

Referring now to FIG. 1, a DC motor 9 is connected in a bridge arrangement with four transistors 1, 2, 3 and 4. One of four diodes 5, 6, 7 and 8 is connected across the emitter and collector of each of the four transistors. A power supply 10 has its positive terminal connected to the emitters of the pnp transistors 1 and 3, and the emitters of the npn transistors 2 and 4 are connected to the negative terminal of the power supply 10, through a resistor 76. In operation, transistors 1 and 2 are turned on simultaneously, for driving the motor 9 in one direction, and transistors 3 and 4 are simultaneously turned on for driving the motor in the other direction.

A resistor 11 is connected between the emitter and base of the transistor 1, and the base of the transistor is connected through a pair of zener diodes 69 and 70 and a resistor 68 to the collector of the npn transistor 66. The emitter of the transistor 66 is connected to the base of the transistor 2, so that when the transistor 66 conducts, both of the transistors 1 and 2 are driven on. Similarly, a resistor 12 is connected between the emitter and base of the transistor 3, and the base of this transistor is connected through zener diodes 71 and 72 and resistor 73 to the collector of a transistor 74. The emitter of the transistor 74 is connected to the base of the transistor 4, so that the transistors 3 and 4 can be driven into conduction when the transistor 74 is made conductive. A resistor 67 is connected across the base emitter junction of the transistor 66 in order to speed cut-off of the transistor when desired. A similar resistor 75 is employed with the transistor 74.

Because the resistor 76 is interconnected between the emitters of the transistors 2 and 4 and the negative terminal of the power supply 10, the potential at the junction of the emitters of the transistors 2 and 4 is proportional to current flowing through the motor.

A digital counter 16, which is preferably a four-stage binary counter, is connected to count clock pulses generated by an oscillator incorporating three series-connected inverters 13a, 13b and 13c. A resistor 15 is connected between the output of the inverter 13b and the input of the following inverter 13c, and this input is connected to ground by a capacitor 14, so that the time constant of the components 15 and 14 establishes the frequency of the oscillator. In one embodiment, a clock frequency of about 32 kHz was found to be satisfactory. The four binary outputs of the counter 16 are connected to the inverting input of an amplifier 25 by means of resistors 18, 19, 20 and 21, chosen to have a resistance ratio of 1, 2, 4 and 8, whereby current flowing therethrough toward the inverting input of the operational amplifier constitutes an analog representation of the digital state of the contour. The non-inverting input of the amplifier 25 is connected to ground. Since the counter counts continuously, this voltage forms a 16 step stair-step waveform, which automatically repeats at the end of each cycle.

A further resistor 22 is interconnected between the inverting input of the operational amplifier 25, and the output of an operational amplifier 24. The current through the resistor 22 is proportional to the feed-back signal.

The various feed-back inputs such as signals responsive to position of a movable member, velocity of the member, etc. are connected to the inverting input of an operational amplifier 26. In the arrangement shown in FIG. 1, the position signal is connected to this input through a resistor 27, and a velocity input is connected thereto through a resistor 28, in parallel with the series circuit including resistor 40 and capacitor 41. The amplifier 26 has a negative feed-back circuit incorporating resistor 29 and capacitor 30, which are chosen to give a stable range of operation of the amplifier 26. The non-inverting input of the amplifier 26 is connected to ground.

A pair of additional amplifiers 23 and 24 are employed as a precision rectifier, to rectify the signal produced at the output of the amplifier 26. When the output of the amplifier 26 is positive, current is passed to the amplifier 24 through the resistor 40a, to produce a negative potential at the output of the amplifier 24, and a corresponding current through the resistor 22. When the output of the amplifier 26 is negative, amplifier 23, which has its inverting input connected to the output of the amplifier 26 by a resistor 31, is effective to invert the signal and supply a positive current through the resistor 33 to the inverting input of the amplifier 24. A diode 34 interconnected between the output of the amplifier 23 and the resistor 33, prevents the amplifier 23 from affecting operation of the amplifier 24 when the output of the amplifier 26 is positive. A feed-back resistor 32 controls the gain of the amplifier 23, and a feed-back resistor 37 controls the gain of the amplifier 24.

A resistor 77 connects the emitters of the transistors 2 and 4 to the inverting input of the amplifier 24, so that this amplifier is controlled in part by the motor current through the resistor 76.

The output of the amplifier 23 is connected to its inverting input through a diode 35 and a zener diode 36, which allows the output of the amplifier 23 to develop a substantial negative voltage when its inverting input is positive. This allows the output of amplifier 23 to swing in a substantial direction on both sides of zero voltage, which is used to develop a sign signal, indicating the direction in which the motor 9 is to be energized.

The amount of energization which is applied to the motor is determined by the pulse width modulated output of the amplifier 25. While the combined current flowing through the resistors 18 to 21 is less than the current drawn through the resistor 22, the output of the amplifier 25 is positive, but reverses to a negative value as soon as the stair-step current waveform from the counter 16 exceeds the current run through the resistor 22 by amplifier 24.

The output of the amplifier 25 is connected through a diode 56 to a pair of inputs of a NOR-gate 54, connected as an inverter. The inputs are also connected to ground by a resistor 55. The circuit including the resistor 55 and the diode 56 operates as a clamp, to clamp the voltage between limits suitable for the NOR-gate 54. The output of the NOR-gate 54 is passed through an inverter 53 to the clock input of a D flip-flop 52. The D input of the flip-flop 52 is connected to ground, so that the signal from the inverter 53 functions to reset the flip-flop. The set input of the flip-flop is connected to the carry output of the counter 16 through inverters 17 and 57. Thus, the flip-flop 52 is set at the beginning of each cycle, and reset at a time dependent on when the digitally generated stair-step surpasses the feed-back signal. The Q output of the flip-flop 52 is connected to one input of each of a pair of NOR-gates 50 and 51, which are effective to drive the motor 9 in one direction or the other, and in accordance with the sign signal, developed at the output of the amplifier 23.

The output of the amplifier 23 is connected to the inverting input of an amplifier 42 through resistor 38, the output of which is smoothed by a feed-back capacitor 39. The output of the amplifier 42 is connected through a diode 43 to the input of an inverter 45, and to ground through a resistor 44. The diode-resistor network clamps the negative-going portion of the output of the amplifier 42, and the output of the inverter 45 is connected to the data input of a D flip-flop 46. The clock input of the flip-flop is connected to the output of the inverter 17, which, as described above, receives the carry-out signal from the counter 16. Accordingly, the state of the flip-flop 46 is determined at the end of each cycle of operation of the counter 16, in accordance with the level at the data input.

The Q output of the flip-flop 46 is connected to the data input of a flip-flop 47, the clock input of which is also connected to the inverter 17. Accordingly, the flip-flop 47 is set to the same state as the flip-flop 46, but at a time delayed by one cycle of operation of the counter 16.

A NAND-gate 48 has its inputs connected to the Q outputs of flip-flops 46 and 47 and a similar NAND-gate 49 has its inputs connected to the $\overline{Q}$ output of these flip-flops. Accordingly, the outputs of both NAND-gates are high unless both flip-flops have the same state. When both flip-flops are in the same state, the output of one of the NAND-gates is low. The output of the NAND-gate 48 is connected to the second input of the NOR-gate 50, while the output of the NAND-gate 49 is connected to the second input of the NOR-gate 51. Accordingly, one of the NOR-gates is energized, for the duration of the $\overline{Q}$ output of the flip-flop 52, as long as the flip-flops 46 and 47 are in the same state. Since these flip-flops are not in the same state during the first cycle following a change in sign of the output of the amplifier 23, neither of the NOR-gates 50 and 51 are energized during that cycle. This allows for one cycle of operation during which none of the transistors 1, 2, 3 and 4 are energized, when the direction of energization of the motor 9 is to be reversed. This gives ample opportunity for the conducting transistors to be cut off, thereby avoiding a possible short circuit across the power supply.

The output of the NOR-gate 50 is connected through an inverter 65 and a resistor 64 to the base of an amplifying transistor 61. The emitter of the transistor 61 is connected to ground and its collector is connected to a source of positive potential by a resistor 63, and also to the base of the transistor 66 over a line 79. The output of the NOR-gate 51 is similarly connected through an inverter 58 and resistor 59 to the base of a transistor 60. The collector of the transistor 60 is connected to a positive source of potential through a resistor 62 and is also connected by a line 78 to the base of the transistor 74.

Referring to FIG. 2, a waveshape is shown illustrating two cycles of forward operation of the motor 9, and reverse cycles. During the forward cycles, current is supplied to the motor 9 through transistors 1 and 2 for a duration W, after which these transistors are cut off. Energy stored in the inductance of the motor causes current to continue to flow afterward, through diodes 7 and 8, returning energy to the power source 10. This accounts for the short negative-going waveform following the first two cycles of operation illustrated in FIG. 2. The second two cycles illustrated in FIG. 2 illustrate the operation in the reverse direction. It is seen that the wave-forms are the inverse of the first two cycles.

While the transistors 1, 2, 3 and 4 have been shown as simple transistors, power darlington circuits may be employed if desired, in which case each of the transistors illustrated in FIG. 1 would actually be embodied by two or more transistors of the appropriate polarity. In addition, if it is desired to eliminate the need for high-power pnp transistors, the transistors 1 and 3 can be replaced by a high-power npn transistor driven by a low-power signal pnp transistor, as familiar to those skilled in the art.

It is apparent from the foregoing that the apparatus of the present invention represents an extremely simple control circuit which is capable of driving the motor 9 in either direction with a high degree of control. In the apparatus illustrated, the degree of control is determined by the 16 states of the binary counter 16, and an even finer degree of control can be achieved by substituting a counter with five or more binary stages.

The resistors 31, 32 and 33 are all of approximately the same value, and the resistor 40 is approximately twice that value. The resistor 37 has a resistance of 10 to 20 times the value of the resistor 40, so that the gain of amplifier 24 is in the range of 10–20. This allows for relatively wide voltage swings, for small variations in feed-back signals, so that the degree of control is very precise. Preferably, a CMOS integrated circuit is used for the counter 16, so that relatively high voltage levels are available as outputs of the counter. This insures that as soon as the stair-step waveform exceeds the feed-back signal, the amplifier 25 is fully cut off, without hesitating in a partially cut-off state.

The circuit for extracting the sign signal from the amplifier 23 allows the extraction of a bi-directional sign signal which can be readily amplified to indicate unambiguously the signs for even small amplitudes of feed-back signals. The circuit for delaying energization of the reversing pair of transistors safeguards transistor operation and prevents accidental short circuits across the power supply.

It will be apparent that various modifications and additions may be made in the apparatus disclosed without departing from the essential features of novelty thereof, which are intended to be defined and secured by the appended claims.

What is claimed is:

1. A digital motor control circuit for a DC motor, including means for generating an analog feedback signal indicative of the speed of said motor; comprising a plurality of driving elements connected in two groups, a power supply, a first of said groups being connected to supply current from said power supply to said motor for powering the motor in a forward direction, and the other group being connected to supply current from said power supply to said motor for powering the motor in the reverse direction, a source of clock pulses, a digital counter connected to said source of clock pulses and operative continuously, a digital-to-analog converter connected to said counter for connecting a stair-step waveform having levels corresponding to the state of said counter, comparator means connected to said digital-to-analog converter for comparing said analog feedback signal indicative of the speed of said motor with said stair-step waveform, means connected to said comparator means for deriving a pulse width modulated signal consisting of pulses having leading and trailing edges, one edge of each of said pulses being established in response to a comparison between said stair-step waveform and said feedback signal, and the other edge being established at the beginning of each cycle of said stair-step waveform, means connected to receive said pulse width modulated waveform for controlling one or the other group of said driving elements, means for deriving a signal responsive to the sign of said feedback signal, means for storing said sign signal, means for comparing said sign signal with a previously stored sign signal, and means for interrupting operation of said driving elements for at least one cycle of operation of said counter coincident with each change in sign, a precision rectifier for providing an amplified signal corresponding to the absolute value of said feedback signal, said rectifier including an inverting amplifier having an input resistor and two parallel feedback circuits, one feedback circuit having a diode poled relative to the output terminals of said amplifier in one direction and having a resistor equal to said input resistor for establishing unity gain in one mode of operation of said amplifier, and the other feedback circuit having a diode poled in the opposite direction and a zener diode for determining the output voltage of said amplifier in another mode of operation of said amplifier, and means connected to the output of said amplifier to receive said sign signal.

2. A digital motor control circuit for a DC motor, including means for generating an analog feedback signal indicative to the speed of said motor; comprising a plurality of driving elements connected in two groups, a power supply, a first of said groups being connected to supply current from said power supply to said motor for powering the motor in a forward direction, and the other group being connected to supply current from said power supply to said motor for powering the motor in the reverse direction, a source of clock pulses, a digital counter connected to said source of clock pulses and operative continuously, a digital-to-analog converter connected to said counter for generating a stair-step waveform having levels corresponding to the state of said counter, comparator means connected to said digital-to-analog converter for comparing said analog feedback signal indicative of the speed of said motor with said stair-step waveform, means connected to said comparator means for deriving a pulse width modulated signal consisting of pulses having leading and trailing edges, one edge of each of said pulses being established in response to a comparison between said stair-step waveform and said feedback signal, and the other edge being established at the beginning of each cycle of said stair-step waveform, means connected to receive said pulse width modulated waveform for controlling one or the other group of said driving elements, means for deriving a signal responsive to the sign of said feedback signal, means for storing said sign signal, means for comparing said sign signal with a previously stored sign signal, and means for interrupting operation of said driving elements for at least one cycle of operation of said counter coincident with each change in sign, said means for storing said sign signal comprising first and second clocked flip-flops, and said means for comparing sign signals comprising a logic circuit connected to said first and second flip-flops, said logic circuit comprising a first gate connected to the true output of said first flip-flop and the true output of said second flip-flop, and a second gate connected to the complement output of said second flip-flop and the complement output of said first flip-flop, whereby one of said gates is able to produce an output signal when said flip-flops are in the same state, and neither said gates is able to produce an output signal when said flip-flops are not in the same state, and means connecting said first and second gates to enable mutually exclusive groups of said driving elements.

3. A digital motor control circuit for a DC motor, including means for generating an analog feedback signal indicative of the speed of said motor; comprising a plurality of driving elements connected in two groups, a power supply, a first of said groups being connected to supply current from said power supply to said motor for powering the motor in a forward direction, and the other group being connected to supply current from said power supply to said motor for powering the motor in the reverse direction, a source of clock pulses, a digital counter connected to said source of clock pulses and operative continuously, a digital-to-analog converter connected to said counter for generating a stair-step waveform having levels corresponding to the state of said counter, comparator means connected to said digital-to-analog converter for comparing said analog feedback signal indicative of the speed of said motor with said stair-step waveform, means connected to said comparator means for deriving a pulse width modulated signal consisting of pulses having leading and trailing edges, one edge of each of said pulses being established in response to a comparison between said stair-step waveform and said feedback signal, and the other edge being established at the beginning of each cycle of said stair-step wveform, means connected to receive said pulse width modulated waveform for controlling one or the other group of said driving elements, and a precision rectifier, connected to receive said analog feedback signal for providing at its output an amplified signal corresponding to the absolute value of said analog feedback signal, said rectifier including an inverting amplifier having an input connected to receive said analog feedback signal and having two parallel feedback circuits connected between the output and input of said amplifier, said feedback circuits each having a diode poled in opposited directions for establishing different feedbacks for opposite polarities of the output of said amplifier.

* * * * *